United States Patent
Cahana et al.

(10) Patent No.: US 10,425,475 B2
(45) Date of Patent: Sep. 24, 2019

(54) DISTRIBUTED DATA MANAGEMENT

(71) Applicant: International Business Machines Corporation, Armonk, NY (US)

(72) Inventors: Zvi Cahana, Nahariya (IL); Etai Lev-Ran, Nofit (IL); Idan Zach, Givat Ela (IL)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 15/442,719

(22) Filed: Feb. 27, 2017

(65) Prior Publication Data

US 2018/0248940 A1    Aug. 30, 2018

(51) Int. Cl.
| | |
|---|---|
| *H04L 29/08* | (2006.01) |
| *H04L 12/26* | (2006.01) |
| *H04L 29/06* | (2006.01) |
| *H04L 12/24* | (2006.01) |
| *H04L 29/14* | (2006.01) |

(52) U.S. Cl.
CPC ...... *H04L 67/1031* (2013.01); *H04L 41/5025* (2013.01); *H04L 43/0805* (2013.01); *H04L 43/16* (2013.01); *H04L 67/10* (2013.01); *H04L 67/42* (2013.01); *H04L 69/28* (2013.01); *H04L 69/40* (2013.01)

(58) Field of Classification Search
CPC .................................................. H04L 67/1031
USPC ....................................................... 709/223
See application file for complete search history.

(56) References Cited

U.S. PATENT DOCUMENTS

| | | | | |
|---|---|---|---|---|
| 6,807,264 | B1* | 10/2004 | Booton | H04Q 3/0025 379/201.01 |
| 6,859,834 | B1* | 2/2005 | Arora | G06F 9/5033 709/225 |
| 7,376,790 | B2 | 5/2008 | Lango et al. | |
| 7,483,990 | B2* | 1/2009 | Baratakke | H04L 47/10 709/220 |
| 7,990,847 | B1* | 8/2011 | Leroy | H04L 43/0817 370/216 |
| 8,452,733 | B2 | 5/2013 | Chan et al. | |
| 8,719,432 | B1 | 5/2014 | Vermeulen et al. | |
| 9,058,326 | B1 | 6/2015 | Hamel et al. | |
| 2001/0049732 | A1* | 12/2001 | Raciborski | G06F 17/30864 709/224 |

(Continued)

OTHER PUBLICATIONS

Microsoft Computer Dictionary, "timeout", "timestamp", "time stamp", "Time to Live", 5th edition, pp. 520-521, 2002 (Year: 2002).*

*Primary Examiner* — Ondrej C Vostal
(74) *Attorney, Agent, or Firm* — Barry Blount

(57) ABSTRACT

In some examples, a system for managing distributed data can include a processor to detect an update notification from a client device to update a managing server, the update notification indicating that a remote server node is unavailable. The processor can also generate a comparison value by comparing a first time stamp to a second time stamp, wherein the first time stamp corresponds to a time at which the system receives the update notification from the client device and the second time stamp corresponds to a time the remote server node transmits a set of renewal data. Furthermore, the processor can determine that the comparison value indicates the remote server node is unavailable and remove the remote server node from the managing server.

20 Claims, 7 Drawing Sheets

(56) References Cited

U.S. PATENT DOCUMENTS

| | | | |
|---|---|---|---|
| 2003/0200277 A1* | 10/2003 | Kim | G06Q 20/401 |
| | | | 709/217 |
| 2006/0020686 A1* | 1/2006 | Liss | H04L 41/0206 |
| | | | 709/219 |
| 2007/0224978 A1* | 9/2007 | Wherry | H04L 51/04 |
| | | | 455/414.2 |
| 2007/0288621 A1* | 12/2007 | Gundu | H04W 8/005 |
| | | | 709/223 |
| 2009/0100075 A1* | 4/2009 | Karlsson | G06F 16/27 |
| 2009/0228547 A1* | 9/2009 | Miyaoka | H04L 67/1095 |
| | | | 709/203 |
| 2010/0149975 A1* | 6/2010 | Tripathi | H04L 67/04 |
| | | | 370/230.1 |
| 2012/0077496 A1* | 3/2012 | Mathias | G06Q 30/06 |
| | | | 455/435.1 |
| 2013/0111461 A1* | 5/2013 | Zubas | G06F 8/654 |
| | | | 717/173 |
| 2014/0258367 A1* | 9/2014 | Suryavanshi | H04L 65/1073 |
| | | | 709/203 |
| 2015/0067004 A1 | 3/2015 | Shvachko et al. | |
| 2016/0344845 A1* | 11/2016 | Shuman | H04L 67/18 |
| 2017/0034134 A1* | 2/2017 | Huang | H04L 67/42 |
| 2017/0352115 A1* | 12/2017 | Trevathan | G06Q 50/184 |

* cited by examiner

300

DISTRIBUTED DATA MANAGEMENT

BACKGROUND

The present disclosure relates to distributed data, and more specifically, but not exclusively, to managing distributed data.

SUMMARY

According to an embodiment described herein, a system for distributed data management can include a processor to send a distributed data request to a remote server node. The processor can also detect that a period of time elapses without receiving the requested distributed data from the remote server node and update a managing server by sending a server message to the managing server indicating that the remote server node is unavailable. Furthermore, the processor can send the distributed data request to a second remote server node.

According to another embodiment, a system for managing distributed data can include a processor to detect an update notification from a client device to update a managing server, the update notification indicating that a remote server node is unavailable. The processor can also generate a comparison value by comparing a first time stamp to a second time stamp, wherein the first time stamp corresponds to a time at which the system receives the update notification from the client device and the second time stamp corresponds to a time the remote server node transmits a set of renewal data. Furthermore, the processor can determine that the comparison value indicates the remote server node is unavailable and remove the remote server node from the managing server.

According to another embodiment, a computer program product for distributed data management can include a computer readable storage medium having program instructions embodied therewith, wherein the computer readable storage medium is not a transitory signal per se. The program instructions can be executable by a processor to cause the processor to detect an update notification from a client device to update a managing server, the update notification indicating that a remote server node is unavailable. The program instructions can also cause the processor to generate a comparison value by comparing a first time stamp to a second time stamp, wherein the first time stamp corresponds to a time at which the system receives the update notification from the client device and the second time stamp corresponds to a time the remote server node transmits a set of renewal data. Furthermore, the program instructions can cause the processor to determine that the comparison value indicates the remote server node is unavailable and remove the remote server node from the managing server.

DETAILED DESCRIPTION

Figure 1:
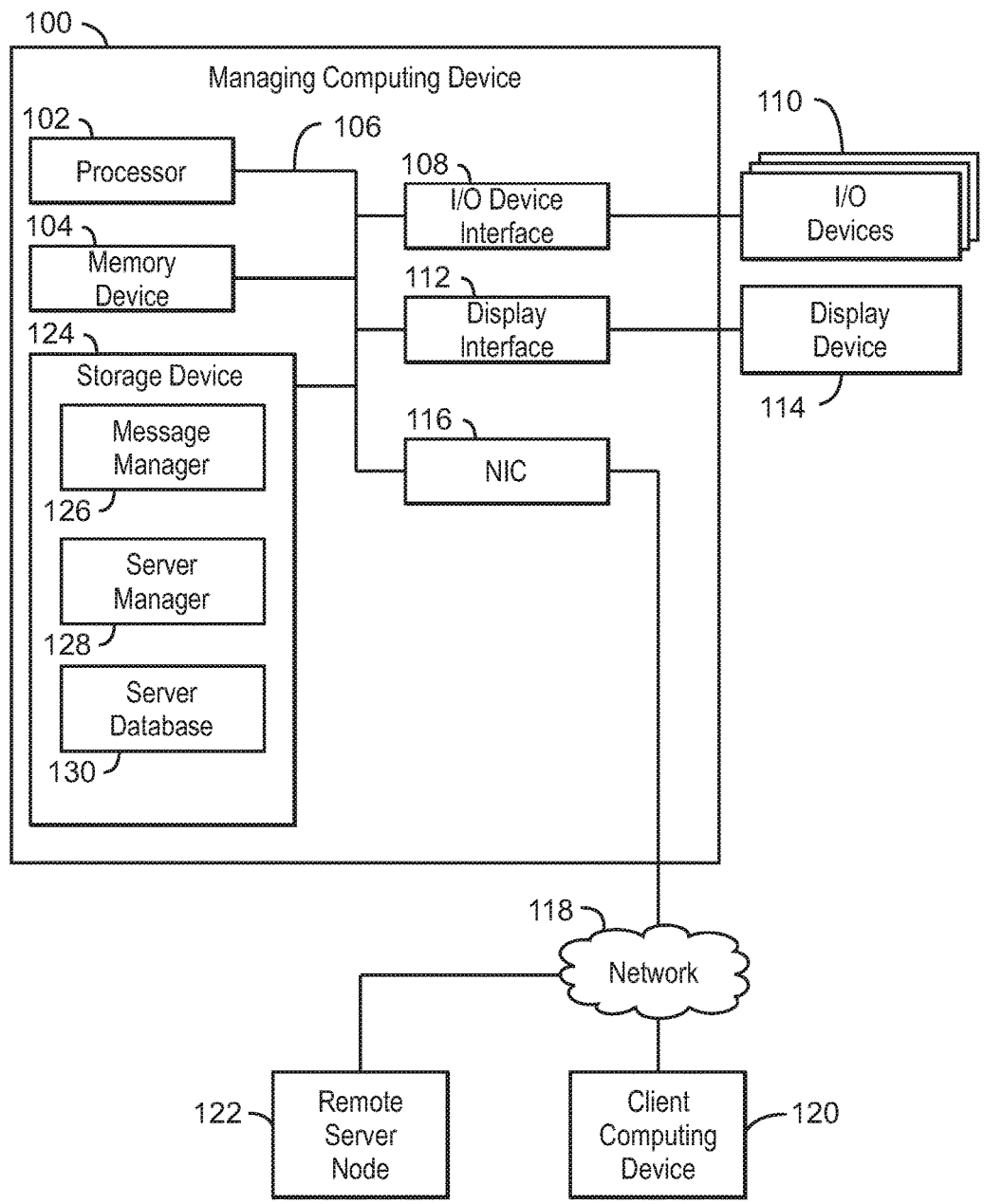
FIG. 1 depicts a block diagram of an example computing system that can manage distributed data according to an embodiment described herein.

As client devices increasingly rely on services provided by remote servers, managing data for the client devices becomes more complex. Data store systems are often composed of a cluster of servers that employ replication to provide high availability and durability of the client data. Although cluster servers are connected and can directly communicate with each other, the client device may not be able to determine which servers belong to the cluster. In some embodiments, the client device communicates with a load balancer or reverse proxy to scale back end servers or to provide services, such as caching, or authentication and security, to a set of back end servers. In some embodiments, load balancers maintain an open connection with back end servers. Accordingly, the load balancers can automatically determine if a back end server is no longer available. In other embodiments, such as in cloud and web based systems, a load balancer may not maintain an open connection with back end servers. Rather, the back end servers may provide time to live packets to indicate to the load balancer that the back end servers are still available.

The techniques described herein minimize the time that outdated or stale data is returned to client devices by using external knowledge. External knowledge, as referred to herein, includes data obtained by client devices regarding remote server nodes or cluster servers that provide a service. In some embodiments, when a client device detects that data corresponding to the clustered servers is stale or outdated, the client device can respond to a managing server in the cluster. Therefore, the client device can update data regarding the clustered servers even though the client device is not an owner of the data or storage location for the data. The techniques enable updating data corresponding to a clustered server more frequently. For example, time to live messages can be transmitted from remote server nodes to a managing server node at a predetermined frequency to indicate remote server availability. In some embodiments, techniques described herein enable a managing server to detect stale or outdated data prior to a time to live message expiring.

The embodiments described herein include techniques for managing distributed data. In some examples, a client system can send a request for distributed data to a remote server node and detect that a period of time elapses without receiving the distributed data from the remote server node. The client system can also update a managing server by sending a server message to the managing server indicating that the remote server node is unavailable. In some embodiments, the client system can send a request for the data to a second remote server node.

The managing server described herein can detect an update notification from a client system to update the managing server, the update notification indicating that a remote server node is unavailable. The managing server can also generate a comparison value by comparing a first time stamp to a second time stamp, wherein the first time stamp corresponds to a time at which the managing server receives the request from the client system and the second time stamp corresponds to a time the remote server node transmits a set of renewal data. Furthermore, the managing server can determine that the comparison value indicates the remote server node is unavailable, and remove any identifying information for the remote server node from the managing server.

With reference now to FIG. 1, an example computing device is depicted that can manage distributed data. The managing server 100 may be for example, a server, desktop computer, laptop computer, tablet computer, or smartphone. In some examples, managing server 100 may be a cloud computing node. Managing server 100 may be described in the general context of computer system executable instructions, such as program modules, being executed by a computer system. Generally, program modules may include routines, programs, objects, components, logic, data structures, and so on that perform particular tasks or implement particular abstract data types. Managing server 100 may be practiced in distributed cloud computing environments where tasks are performed by remote processing devices that are linked through a communications network. In a distributed cloud computing environment, program modules may be located in both local and remote computer system storage media including memory storage devices.

The managing server 100 may include a processor 102 that is adapted to execute stored instructions, a memory device 104 to provide temporary memory space for operations of said instructions during operation. The processor can be a single-core processor, multi-core processor, computing cluster, or any number of other configurations. The memory 104 can include random access memory (RAM), read only memory, flash memory, or any other suitable memory systems.

The processor 102 may be connected through a system interconnect 106 (e.g., PCI®, PCI-Express®, etc.) to an input/output (I/O) device interface 108 adapted to connect the managing server 100 to one or more I/O devices 110. The I/O devices 110 may include, for example, a keyboard and a pointing device, wherein the pointing device may include a touchpad or a touchscreen, among others. The I/O devices 110 may be built-in components of the managing server 100, or may be devices that are externally connected to the managing server 100.

The processor 102 may also be linked through the system interconnect 106 to a display interface 112 adapted to connect the managing server 100 to a display device 114. The display device 114 may include a display screen that is a built-in component of the managing server 100. The display device 114 may also include a computer monitor, television, or projector, among others, that is externally connected to the managing server 100. In addition, a network interface controller (NIC) 116 may be adapted to connect the managing server 100 through the system interconnect 106 to the network 118. In some embodiments, the NIC 116 can transmit data using any suitable interface or protocol, such as the internet small computer system interface, among others. The network 118 may be a cellular network, a radio network, a wide area network (WAN), a local area network (LAN), or the Internet, among others. A client computing device 120 may connect to the managing server 100 through the network 118. In some examples, client computing device 120 can send a request for distributed data to a remote server node 122. The client computing device 120 can also detect that a period of time elapses without receiving the distributed data from the remote server node and update a managing server by sending a server message to the managing server indicating that the remote server node is unavailable. A server message, as referred to herein, can indicate that a remote server node is no longer able to process distributed data requests. Furthermore, the client computing device 120 can send the distributed data request for the distributed data to a second remote server node. In some embodiments, a remote server node 122 may be an external webserver such as a cloud computing node or a server in a clustered computing environment.

The processor 102 may also be linked through the system interconnect 106 to a storage device 124 that can include a hard drive, an optical drive, a USB flash drive, an array of drives, or any combinations thereof. In some examples, the storage device may include a message manager 126, a server manager 128, and a server database 130. In some embodiments, the message manager 126 can detect an update notification from a client to update the managing server or managing server 100, the update notification indicating that a remote server node is unavailable. In some embodiments, the message manager 126 can also generate a comparison value by comparing a first time stamp to a second time stamp, wherein the first time stamp corresponds to a time at which the system receives the request from the client and the second time stamp corresponds to a time the remote server node transmits a set of renewal data. Furthermore, the server manager 128 can determine that the comparison value indicates the remote server node is unavailable and remove remote server node data from the managing server. In some embodiments, the managing server includes the server database 130, which includes a list of available remote server nodes that can process requests for distributed data. The server database 130 may include any suitable identifying information for each remote server node such as an internet protocol address, machine identifier, media access control address, and the like.

It is to be understood that the block diagram of FIG. 1 is not intended to indicate that the managing server 100 is to include all of the components shown in FIG. 1. Rather, the managing server 100 can include fewer or additional components not illustrated in FIG. 1 (e.g., additional memory components, embedded controllers, modules, additional network interfaces, etc.). Furthermore, any of the functionalities of the message manager 126, the server manager 128, and the server database 130 may be partially, or entirely, implemented in hardware and/or in the processor 102. For example, the functionality may be implemented with an application specific integrated circuit, logic implemented in an embedded controller, or in logic implemented in the processor 102, among others. In some embodiments, the functionalities of the message manager 126, the server manager 128, and the server database 130 can be implemented with logic, wherein the logic, as referred to herein, can include any suitable hardware (e.g., a processor, among others), software (e.g., an application, among others), firmware, or any suitable combination of hardware, software, and firmware.

Figure 2:
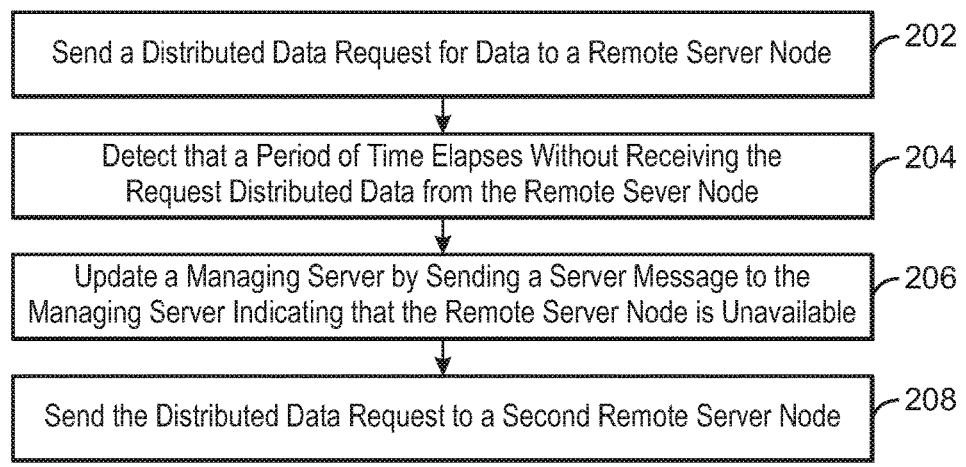
FIG. 2 is a process flow diagram of an example method, implemented by a managing server, that can manage distributed data according to an embodiment described herein.

FIG. 2 is a process flow diagram of an example method that can manage distributed data for a client device. The method 200 can be implemented with any suitable computing device, such as the client device 120 of FIG. 1.

At block 202, a client device can send a distributed data request to a remote server node. For example, the client device can be a consumer client that is to request distributed data from a managing server, which can forward the distributed data request to any suitable remote server node.

Distributed data, as referred to herein, can include any information or data used to contact a clustered server or remote server network. In some embodiments, any suitable number of remote server nodes can receive and process the distributed data request. For example, the remote server nodes may be interconnected using clustering techniques to enable providing a distributed service (also referred to as a cloud service). Accordingly, the distributed data can correspond to a service provided by a remote server node.

In some examples, the requested distributed data corresponds to a service provided by a remote server node. For example, the client device can send a stream of distributed data requests using messages and a stateless protocol to a remote server node to access a data storage service. The messages arrive at a front-end server (also referred to herein as a managing server), which selects one remote server node or cluster member from a pool of remote server nodes that are implementing the data storage service. In some examples, each message can correspond to any suitable data stored in the data storage service.

In some embodiments, messages sent directly by a client device to a remote server node can correspond to various actions. For example, a message can correspond to a client device establishing distributed data. In some examples, a client device establishes distributed data by transmitting the data to a data storage service at a local client time T. A remote server node can assign the data a unique identifier and return the identifier and a time to live (TTL) timestamp that corresponds to a time period rather than a particular clock time. The TTL timestamp can indicate a predetermined maximum period of time that a remote server node can store the distributed data. In some embodiments, the client device can send a renewal message before the TTL timestamp expires. Data for which the TTL has expired without receiving a renewal message can expire and be deleted from the remote server nodes.

In some embodiments, messages can also correspond to renewing data in which a remote server node indicates to a managing server that the remote server node requests to extend the lifetime of previously saved data. In some examples, the managing server may allow or fail the operation. In the case of successful completion, the remote server node is guaranteed that the data can remain valid for another time period equal to the TTL timestamp.

Still referring to block 202, in some embodiments, the messages can also correspond to deleting data in which a remote server node notifies a managing server that the remote server node no longer needs data to be stored starting at the given time stamp. In some embodiments, the messages can also correspond to reading data from a data storage service. For example, a remote server node can return the current data with the current time stamp stored in its storage to the client device.

In some embodiments, the managing server can employ any suitable selection policy. Therefore, any remote server node may receive any message. Specifically, read messages and delete messages can be directed to a remote server node that did not receive the establish message. In some examples, the data sharing model follows single writer and multiple readers in which the service providing instance is responsible for manipulating the service's state. The messages transmitted from the client device to the remote server node are managed by a managing server described in greater detail below in relation to FIG. 3.

At block 204, the client device can detect that a period of time elapses without receiving the distributed data from the remote server node. For example, the client device can detect that a threshold period of time has been exceeded following the transmission of the distributed data request. In some embodiments, the threshold period of time corresponds to a maximum allowed time allotted to the remote server node for processing the request for distributed data and providing the requested distributed data to the client device.

At block 206, the client device can update a managing server by sending a server message to the managing server indicating that the remote server node is unavailable. For example, in response to detecting that a remote server node has failed to provide requested distributed data within the threshold period of time, the client device can send a server message to a managing server. The server message can include any suitable identifier for a remote server node that has failed to provide requested distributed data. For example, the server message can indicate an internet protocol (IP) address for the remote server node, a machine identifier, a media access control (MAC) address, and the like. In some embodiments, the server message results in a managing server updating a list of available remote server nodes. For example, the server message can result in a managing server deleting an unresponsive remote server node from the managing server or server database. The server message can prevent additional client devices from attempting to request data from an unresponsive remote server node.

In some embodiments, the server message can result in a managing server setting a flag corresponding to a remote server, wherein the flag indicates that the remote server may not be available. In some examples, the managing server may delete a remote server node from the managing server in response to a number of client devices indicating that the remote server node is unresponsive. In some embodiments, the managing server may wait until the number of client devices indicating that the remote server node is unresponsive exceeds a threshold value within a period of time before deleting the remote server node from the managing server.

At block 208, the client device can send the request for the distributed data to a second remote server node. For example, the client device can resend the distributed data request to a managing server. The managing server can forward the distributed data request to a second remote server node in response to the client device querying the managing server for the second remote server node. In some examples, the client device can also detect a second remote server node from a predetermined list of remote server nodes stored on the client device. In some embodiments, the client device can detect an indication from a managing server that the requested distributed data is no longer available by any remote server node. For example, the unavailable remote server node may have deleted the requested distributed data prior to becoming unavailable.

In some embodiments, the client device can detect the second remote server node from a list of prioritized remote server nodes. The list of prioritized remote server nodes can be organized based on flags indicating a number of client devices that have reported each remote server node as unresponsive. For example, remote server nodes that have a flag indicating that no client devices have reported the remote server node as responsive can have a higher priority. The client device can select the second remote server node as the available remote server node with the highest priority.

The process flow diagram of FIG. 2 is not intended to indicate that the operations of the method 200 are to be executed in any particular order, or that all of the operations of the method 200 are to be included in every case. Additionally, the method 200 can include any suitable number of additional operations. For example, the client device can detect a delete message from the managing server node indicating the requested distributed data has been deleted by the remote server node. In some embodiments, the client device can also detect a change to the requested distributed data and transmit an update message to the remote server indicating the change. The update message, as referred to herein, can indicate distributed data returned by a remote server node is outdated or stale. For example, if a client device receives distributed data from a remote server node, the client device can determine if the distributed data is current or outdated. In some examples, the update message can result in the managing server updating distributed data stored in remote server nodes.

Figure 3:
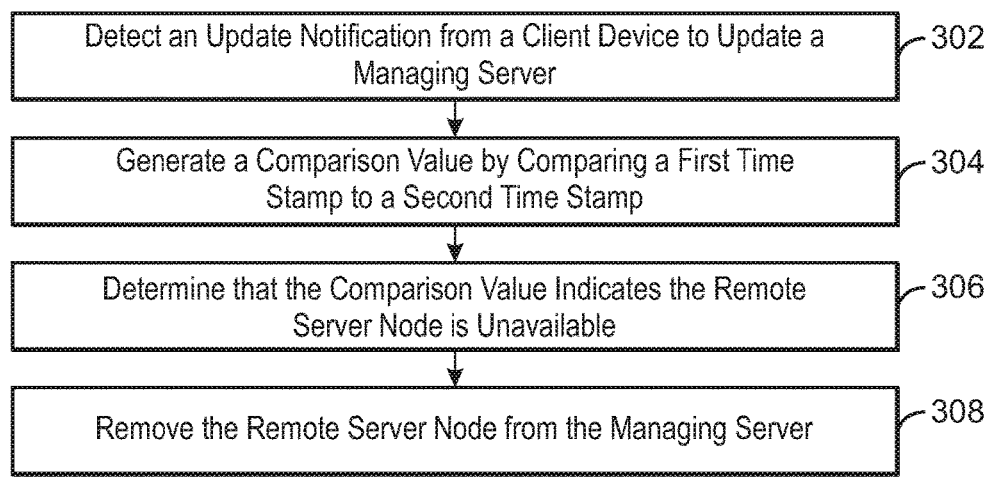
FIG. 3 is a process flow diagram of an example method, implemented by a client device, that can manage distributed data according to an embodiment described herein.

FIG. 3 is a process flow diagram of an example method that can manage distributed data. The method 300 can be implemented with any suitable computing device, such as the managing server 100 of FIG. 1.

At block 302, the message manager 126 can detect an update notification from a client device to update a managing server, the update notification indicating that a remote server node is unavailable. For example, the client device can detect that a request for distributed data was not processed within a predetermined threshold period of time such as a time to live (TTL) timestamp. The client device can transmit an update notification to the message manager 126 in a managing server, wherein the update notification indicates identifying information for a remote server node that is to be updated in the managing server.

At block 304, the message manager 126 can generate a comparison value by comparing a first time stamp to a second time stamp, wherein the first time stamp corresponds to a time at which the system receives the update notification from the client device and the second time stamp corresponds to a time the remote server node transmits a set of renewal data. In some embodiments, a remote server node can provide a set of renewal data at a predetermined rate such as three times a second, or any other suitable frequency. For example, the set of renewal data can indicate identifying information for the remote server node, which provides an assurance to the managing server that the remote server node can process data requests.

In some embodiments, the message manager 126 can use conflict-free replicated data types when an external client informs the managing server via an update notification that a remote server node is unavailable and should be updated in the system. For example, the message manager 126 can verify that the data received from the client device with time stamp T2, which is equal to a time stamp T1 plus a predetermined value below a threshold, is newer than the current data the message manager 126 has received from a remote server node, with time stamp T1. In some embodiments, the message manager 126 compares the two time stamps T1 and T2 to determine the data received from the client device is newer than recently received data from a remote server node. In case the message manager 126 received another update from the client device for the same data with time stamp T3, the message manager 126 can verify that T3 is newer than T2 and ignore the data value with the time stamp T2. In some embodiments, there are several options to ensure that T2 is greater than T1 but smaller than T3. For example, if the message manager 126 can detect a minimal interval between two data write commands or operations, the message manager 126 can set T2 equal to T1 plus a value X, such that X is greater than 0 and X is less than a minimal interval between two write commands. In some examples, if the message manager 126 cannot determine the minimal interval, the message manager 126 can detect a client device's identification, the operation, and the timestamp to define a mathematical comparator function. The comparator function can indicate that if the two time stamps are equal (T1=T2), the message manager 126 can provide precedence by preferring non-owner clients for certain operations. For example, updating data by an owner or client device may take precedence over writing data by a remote server node.

At block 306, the server manager 128 can determine that the comparison value indicates the remote server node is unavailable. For example, the comparison value can indicate that a remote server node has not provided a set of renewal data for a period of time that exceeds a threshold and the client device has provided an update notification.

At block 308, the server manager 128 can remove the remote server node from the managing server. For example, the server manager 128 can delete information corresponding to the remote server node from the managing server to prevent additional client devices from attempting to request data from the unavailable remote server node. In some examples, the server manager 128 can delete data from a server database corresponding to the remote server node. For example, the server manager 128 can delete identifying information for a remote server node such as an IP address, and the like. In some embodiments, the server manager 128 can remove the remote server node information and store the remote server node information in a separate list of removed server nodes to be monitored. For example, network connections can prevent communication with a remote server node for a period of time. However, the server manager 128 can periodically determine if remote server nodes have become available again using pinging techniques or any other suitable method.

The process flow diagram of FIG. 3 is not intended to indicate that the operations of the method 300 are to be executed in any particular order, or that all of the operations of the method 300 are to be included in every case. Additionally, the method 200 can include any suitable number of additional operations. In some embodiments, the server manager 128 can fail the update notification from the client device in response to determining that the remote server node is unavailable. In some examples, the message manager 126 can detect the set of renewal data at a predetermined frequency. In some embodiments, the server manager 128 can set a flag corresponding to a remote server, wherein the flag indicates that the remote server may not be available. In some examples, the server manager 128 may delete a remote server node from a managing server in response to a number of client devices indicating that the remote server node is unresponsive.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 4:
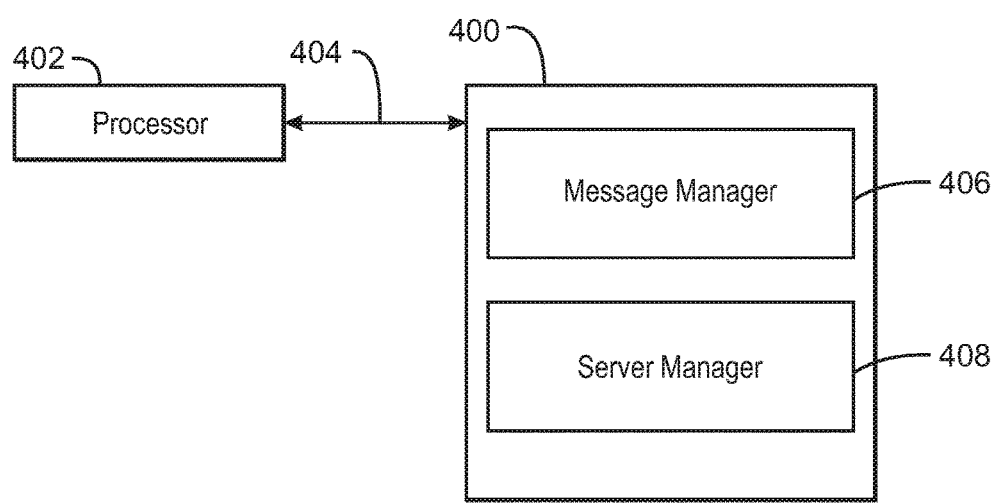
FIG. 4 is a tangible, non-transitory computer-readable medium that can manage distributed data by a managing server according to an embodiment described herein.

Referring now to FIG. 4, a block diagram is depicted of an example of a tangible, non-transitory computer-readable medium that can manage distributed data. The tangible, non-transitory, computer-readable medium 400 may be accessed by a processor 402 over a computer interconnect 404. Furthermore, the tangible, non-transitory, computer-readable medium 400 may include code to direct the processor 402 to perform the operations of the current method. For example, a message manager 406 can detect an update notification from a client device to update a managing server, the update notification indicating that a remote server node is unavailable. The message manager 406 can also generate a comparison value by comparing a first time stamp to a second time stamp, wherein the first time stamp corresponds to a time at which the system receives the update notification from the client device and the second time stamp corresponds to a time the remote server node transmits a set of renewal data. Furthermore, a server manager 410 can determine that the comparison value indicates the remote server node is unavailable and remove the remote server node from the managing server.

It is to be understood that any number of additional software components not shown in FIG. 4 may be included within the tangible, non-transitory, computer-readable medium 400, depending on the specific application. Furthermore, fewer software components than those shown in FIG. 4 can be included in the tangible, non-transitory, computer-readable medium 400.

Figure 5:
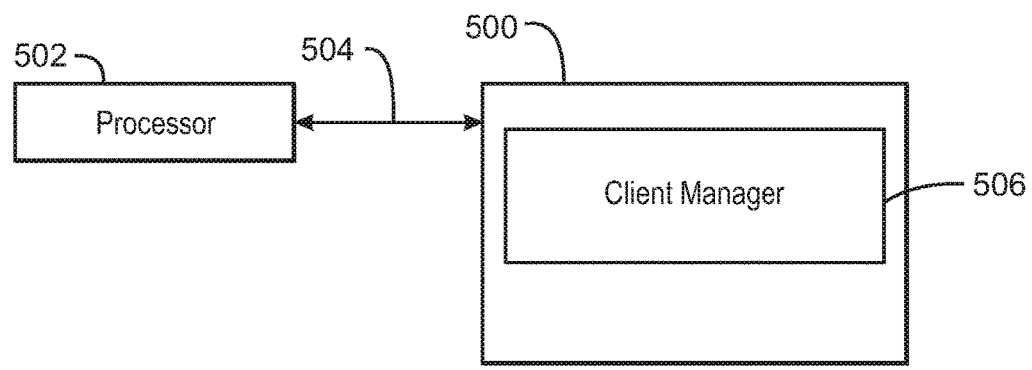
FIG. 5 is a tangible, non-transitory computer-readable medium that can manage distributed data by a client device according to an embodiment described herein.

Referring now to FIG. 5, a block diagram is depicted of an example of a tangible, non-transitory computer-readable medium that can manage distributed data. The tangible, non-transitory, computer-readable medium 500 may be accessed by a processor 502 over a computer interconnect 504. Furthermore, the tangible, non-transitory, computer-readable medium 500 may include code to direct the processor 502 to perform the operations of the current method. For example, a client manager 506 can send a request for distributed data to a remote server node and detect that a period of time elapses without receiving the distributed data from the remote server node. The client manager 506 can also update a managing server by sending a server message to the managing server indicating that the remote server node is unavailable and send the request for the distributed data to a second remote server node.

It is to be understood that any number of additional software components not shown in FIG. 5 may be included within the tangible, non-transitory, computer-readable medium 500, depending on the specific application.

Figure 6:
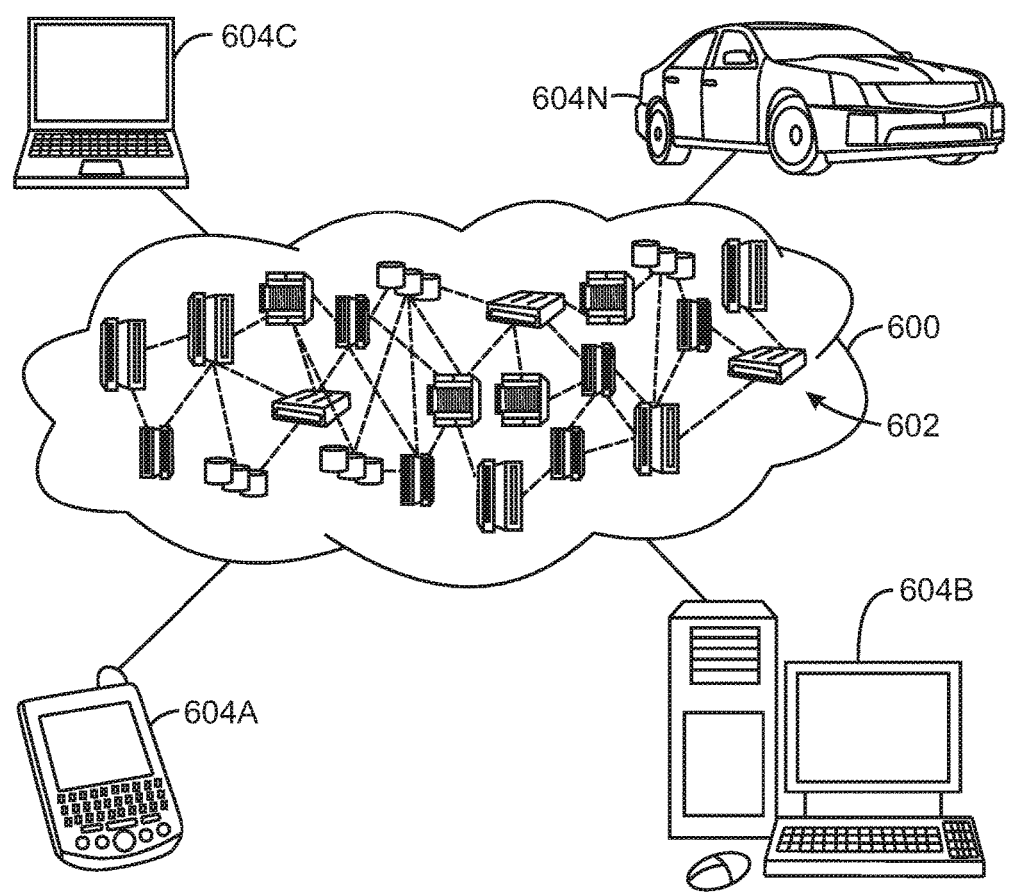
FIG. 6 depicts an illustrative cloud computing environment according to an embodiment described herein.

Referring now to FIG. 6, illustrative cloud computing environment 600 is depicted. As shown, cloud computing environment 600 comprises one or more cloud computing nodes 602 with which local computing devices used by cloud consumers, such as, for example, personal digital assistant (PDA) or cellular telephone 604A, desktop computer 604B, laptop computer 604C, and/or automobile computer system 604N may communicate. Nodes 602 may communicate with one another. They may be grouped (not shown) physically or virtually, in one or more networks, such as Private, Community, Public, or Hybrid clouds as described hereinabove, or a combination thereof. This allows cloud computing environment 600 to offer infrastructure, platforms and/or software as services for which a cloud consumer does not need to maintain resources on a local computing device. It is understood that the types of computing devices 604A-N shown in FIG. 6 are intended to be illustrative only and that computing nodes 602 and cloud computing environment 600 can communicate with any type of computerized device over any type of network and/or network addressable connection (e.g., using a web browser).

Figure 7:
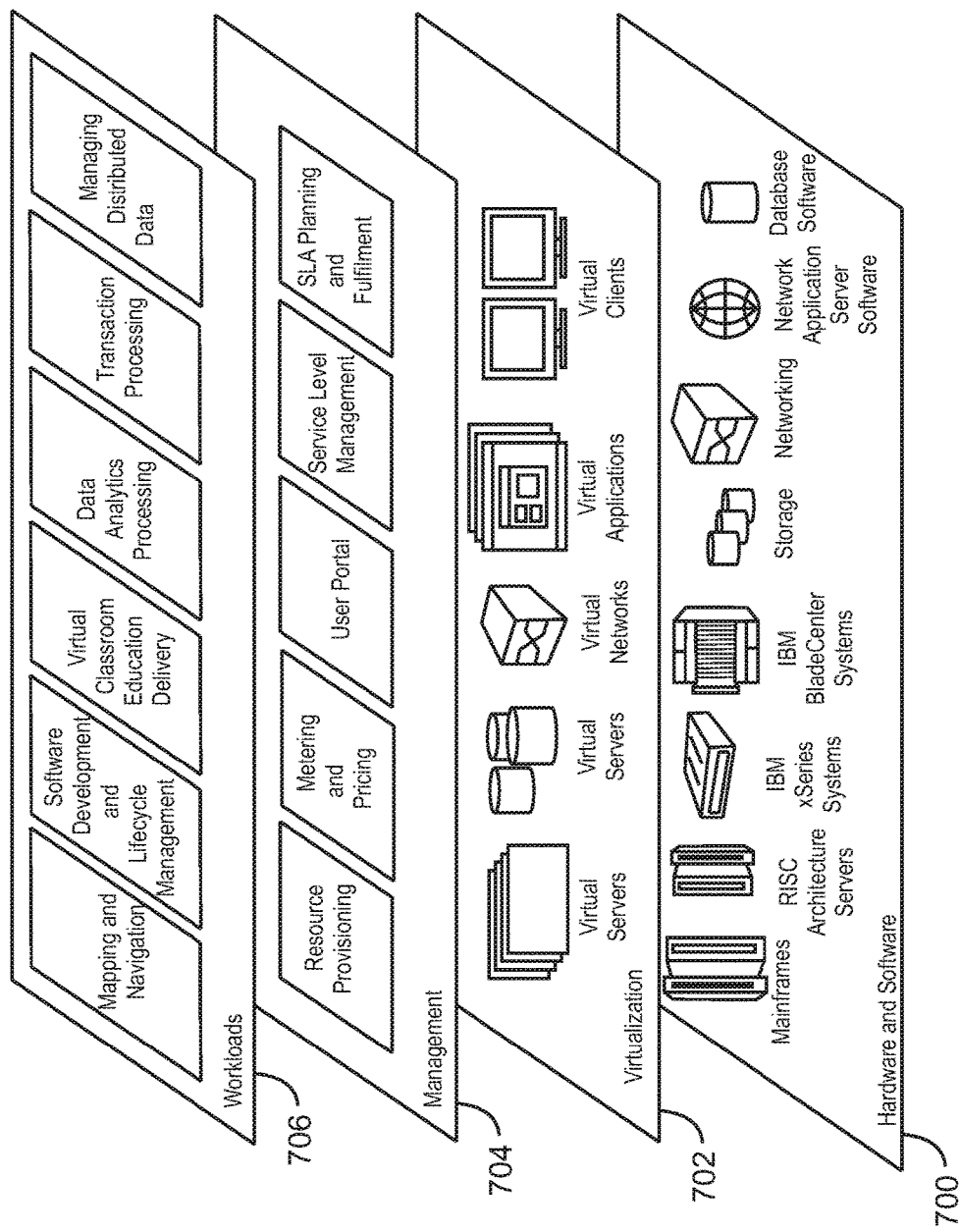
FIG. 7 depicts a set of functional abstraction layers provided by a cloud computing environment according to an embodiment described herein.

Referring now to FIG. 7, a set of functional abstraction layers provided by cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

Hardware and software layer 700 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 702 provides an abstraction layer from which the following examples of virtual entities may be provided: virtual servers; virtual storage; virtual networks, including virtual private networks; virtual applications and operating systems; and virtual clients. In one example, management layer 704 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 706 provides examples of functionality for which the cloud computing environment may be utilized. Examples of workloads and functions which may be provided from this layer include: mapping and navigation; software development and lifecycle management; virtual classroom education delivery; data analytics processing; transaction processing; and managing distributed data.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system for managing distributed data comprising:
   a processor to:
   send a distributed data request to a remote server node;
   detect that a period of time elapses without receiving the requested distributed data from the remote server node;
   update a managing server by sending a server message to the managing server indicating that the remote server node is unavailable, the managing server to generate a comparison value by comparing a first time stamp to a second time stamp, wherein the first time stamp corresponds to a time at which the managing server receives the server message from the system and the second time stamp corresponds to a time the remote server node transmits a set of renewal data to the managing server, wherein the server message by the client device is to take precedence over the set of renewal data by the remote server node in response to the first time stamp and the second time stamp having an equal value; and
   send the distributed data request to a second remote server node.

2. The system of claim 1, wherein the system is a consumer client that is to send the distributed data request to the remote server node via the managing server.

3. The system of claim 1, wherein the system is to monitor whether the remote server node and the second remote server node are available.

4. The system of claim 1, wherein the distributed data corresponds to a service provided by the remote server node.

5. The system of claim 1, wherein the server message indicates an internet protocol address corresponding to the remote server node.

6. The system of claim 1, wherein the processor is to detect a delete message from the managing server node indicating the requested distributed data has been deleted by the remote server node.

7. The system of claim 1, wherein the processor is to detect a change to the requested distributed data and transmit an update message to the remote server indicating the change.

8. A system for managing distributed data comprising:
a processor to:
detect an update notification from a client device to update a managing server, the update notification indicating that a remote server node is unavailable;
generate a comparison value by comparing a first time stamp to a second time stamp, wherein the first time stamp corresponds to a time at which the system receives the update notification from the client device and the second time stamp corresponds to a time the remote server node transmits a set of renewal data, wherein the update notification by the client device is to take precedence over the set of renewal data by the remote server node in response to the first time stamp and the second time stamp having an equal value;
determine that the comparison value indicates the remote server node is unavailable in response to a difference between the first time stamp and the second time stamp exceeding a threshold value; and
remove the remote server node from the managing server.

9. The system of claim 8, wherein the managing server comprises an internet protocol address for a set of remote server nodes.

10. The system of claim 8, wherein the processor is to identify a second remote server node from a predetermined list.

11. The system of claim 10, wherein the processor is to determine the second remote server node in response to querying the managing server for the second remote server node.

12. The system of claim 8, wherein the processor is to remove the remote server node is to prevent additional client devices from attempting to access the remote server node.

13. The system of claim 8, wherein the processor is to fail the update notification from the client device in response to determining that the remote server node is unavailable.

14. The system of claim 8, wherein the processor is to detect the set of renewal data at a predetermined frequency.

15. The system of claim 8, wherein the managing server comprises a database comprising identifying information for a plurality of remote server nodes.

16. A computer program product for managing distributed data, the computer program product comprising a computer readable storage medium having program instructions embodied therewith, wherein the computer readable storage medium is not a transitory signal per se, the program instructions executable by a processor to cause the processor to:
detect an update notification from a client device to update a managing server, the update notification indicating that a remote server node is unavailable;
generate a comparison value by comparing a first time stamp to a second time stamp, wherein the first time stamp corresponds to a time at which the system receives the update notification from the client device and the second time stamp corresponds to a time the remote server node transmits a set of renewal data, wherein the update notification by the client device is to take precedence over the set of renewal data by the remote server node in response to the first time stamp and the second time stamp having an equal value;
determine that the comparison value indicates the remote server node is unavailable in response to a difference between the first time stamp and the second time stamp exceeding a threshold value; and
remove the remote server node from the managing server.

17. The computer program product of claim 16, wherein the program instructions cause the processor to identify a second remote server node from a predetermined list.

18. The computer program product of claim 17, wherein the program instructions cause the processor to determine the second remote server node in response to querying the managing server for the second remote server node.

19. The computer program product of claim 16, wherein the managing server comprises an internet protocol address for a set of remote server nodes.

20. The computer program product of claim 16, wherein the program instructions cause the processor to detect the set of renewal data at a predetermined frequency.

* * * * *